United States Patent Office 2,970,451
Patented Feb. 7, 1961

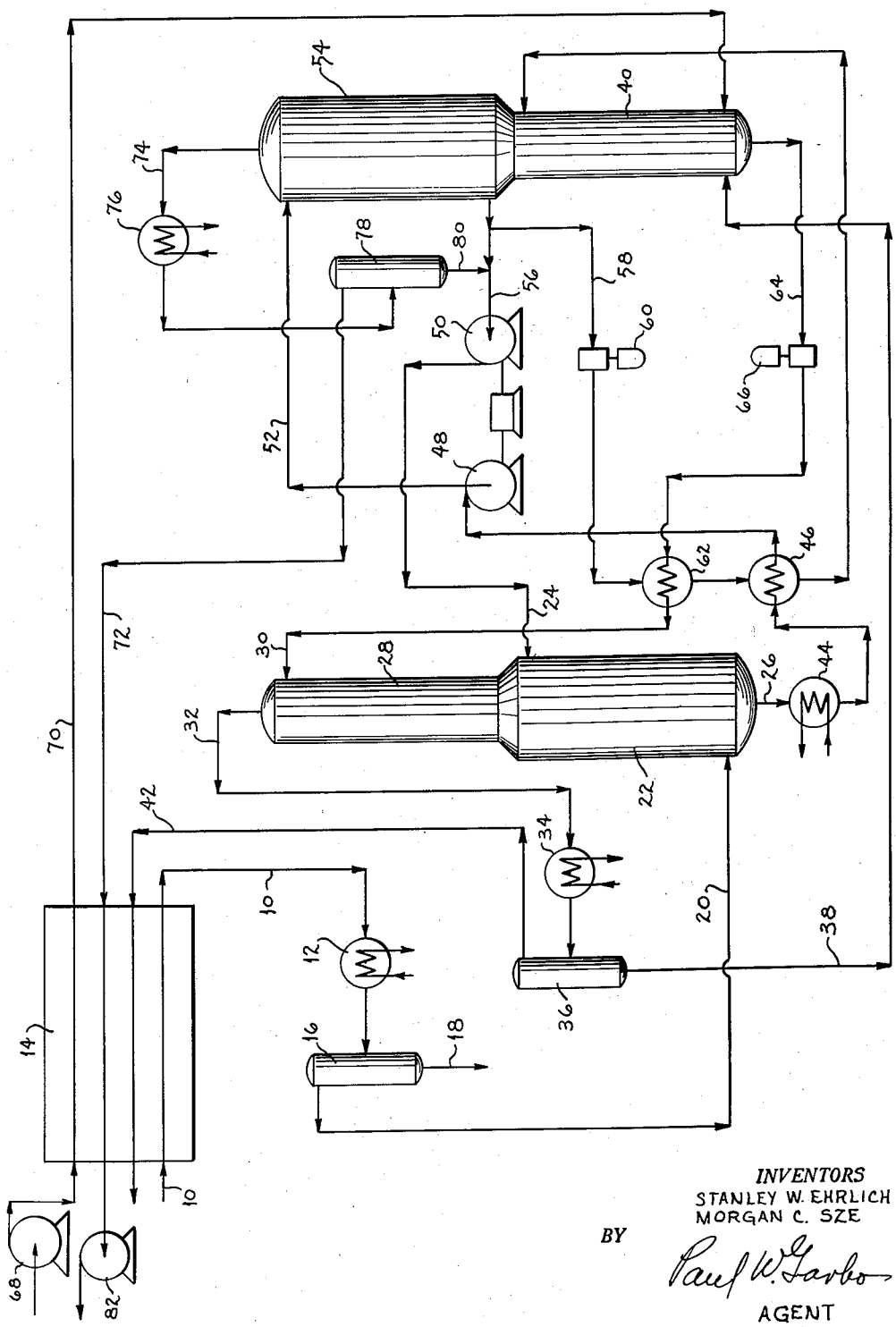

2,970,451

ABSORPTION-DESORPTION IN ABSORBER LIQUID

Stanley W. Ehrlich, Far Rockaway, and Morgan C. Sze, Garden City, N.Y., assignors to Hydrocarbon Research, Inc., New York, N.Y., a corporation of New York Filed Feb. 4, 1958, Ser. No. 713,190

11 Claims. (Cl. 62—17)

This invention relates to the separation and purification of mixed gases by means of absoption. More particuarly, this invention relates to the problem of removing an acidic gas such as carbon dioxide from a gaseous mixture.

It has been proposed to remove at least one component from a gas mixture by contacting the mixture with an absorber liquid having a selective solvent power for the component which it is desired to remove from the mixture, stripping the absorbed component from the resulting solution in a separate stripping zone by contacting the solution with a stripping gas, and recirculating the stripped liquid to the absorption zone. In an improvement of this type of process, as disclosed in copending application Serial No. 517,514, filed June 23, 1955, now U.S. Patent 2,880,591, issued April 7, 1959, the feed gas is first contacted at high pressure with a rich absorber liquid in a rich absoprtion zone wherein most of the soluble gaseous component is absorbed. The residue gas is then contacted with a lean absorber liquid in a lean absorption zone wherein, in order to bring the gas to a certain desired degree of purity, a smaller quantity of the soluble component is removed by absorption. The liquids from both absorption zones are then stripped in a rich stripping zone and a lean stripping zone at pressures substantially lower than those in the absorption zones. If the rich and lean absorber liquids have the same composition, the lean absorber liquid may be passed preferably into the rich absorption zone and the total liquid leaving the rich absorption zone sent to the rich stripping zone wherein a substantial quantity of the absorbed component is stripped from the enriched liquid. The major portion of this stripped liquid is then recirculated to the rich absorption zone as the rich absorber liquid and a minor portion of this stripped liquid is passed through a lean stripping zone wherein a still further quantity of the absorbed component remaining in solution is removed. The liquid leaving the lean stripping zone is then recirculated to the lean absorption zone as the stripped lean absorber liquid.

In large commercial-scale operation, this type of process involves the use of a relatively large quantity of stripping gas, such as air or nitrogen from an air separation plant, which must be sent through the stripping zones. Exemplary of the problems connected with such use of stripping gas are the amount of vaporized absorber liquid which is carried off by this gas and which for economy must be recovered before the stripping gas is disposed of, and the fact that unlimited amounts of a gas suitable for stripping may in some cases not be available.

It is an object of this invention to provide an improved process for the removal of one or more components from a gas mixture by means of absorption. It is a further and more specific object to provide a process for removing one or more components from a gas mixture with absorber liquid which is stripped of the absorbed components by means of a stripping gas under conditions, whereby a decreased quantity of stripping gas accomplishes the desired stripping of absorbed gaseous components from the absorber liquid.

These objects are achieved by carrying out the process with exhausting means applied to the gas exit end of the stripping zones for the purpose of drawing the stripping gas therethrough. It has been found that such use of exhausting means makes it possible to attain the desired degree of stripping with less stripping gas than if, in lieu of such exhausting means, compressing means are employed for the purpose of pushing the stripping gas through the stripping zones.

This invention is particularly useful in a low-temperature absorption process employing rich and lean absorber liquids circulated between two absorption zones and two stripping zones of the type described in the aforementioned application Serial No. 517,514. When this type of process is improved according to this invention, all of the pertinent description in the specification of the latter patent application is intended to apply also to the process as carried out pursuant to this invention.

An illustrative example of a process carried out according to this invention in which carbon dioxide ($CO_2$) is removed from a crude hydrogen-containing gas and in which acetone is utilized as both the lean and rich absorber liquids will now be described with reference to the accompanying drawing which is a schematic diagram of the absorption system.

The feed gas is a shift converter effluent from coal gasification having on a dry basis a composition by volume of 55.4% $H_2$, 39.9% $CO_2$, 2.4% CO, 0.9% A, 0.6% $N_2$, 0.6% $H_2S$, 0.3% $CH_4$ and a trace of COS. This gas saturated with water at a temperature of 100° F. and a pressure of 408 p.s.i.g. (pounds per square inch gauge) enters heat exchanger 14 through line 10 wherein it is cooled by returning pure hydrogen and waste gas streams. The feed gas is further cooled by means of an external refrigerant such as propane in heat exchanger 12 and condensed water is separated out in knock-out drum 16 and withdrawn through line 18, while the gas passes through line 20 into rich absorber 22 at a temperature of −52° F. and a pressure of 397 p.s.i.g.

Acetone at a temperature of −70° F. enters the top of rich absorber 22 through line 24 and passes downward in countercurrent contact with the upflowing gas to absorb most of the $CO_2$ in the gas. Unabsorbed gas leaving absorber 22 flows up through lean absorber 28 in counter-current contact with lean absorber liquid, also acetone, which enters absorber 28 through line 30 at a temperature of −64° F. The purified gas leaves lean absorber 28 through line 32 and has on an acetone-free basis a composition by volume of 93.0% $H_2$, 4.0% CO, 1.5% A, 1.0% $N_2$, 0.4% $CH_4$ and only about 30 parts per million of $CO_2$. Vaporized acetone is removed from the gas leaving lean absorber 28 by cooling this gas with ethylene in heat exchanger 34, drawing off condensed acetone from separator 36 and recycling it to the bottom of lean stripper 40 through line 38. Alternatively, if exchanger 34 and separator 36 are disposed above the top of lean absorber 28, the condensed acetone may be drained directly from separator 36 into the top of lean absorber 28 for reuse therein. The purified hydrogen leaves separator 36 through line 42, is warmed by incoming feed gas and stripping gas in heat exchanger 14, discharging at a temperature of 90° F. and a pressure of 384 p.s.i.g.

The lean absorber liquid containing some absorbed $CO_2$ flows from lean absorber 28 into rich absorber 22 and the total enriched liquid containing absorbed $CO_2$ leaves rich absorber 22 through line 26 at a temperature of −6° F. and a pressure of 397 p.s.i.g. The enriched liquid is then cooled to −7° F. with propane in heat exchanger 44 and is cooled further to −11° F. in heat exchanger 46 by partially stripped acetone flowing to lean stripper 40. It is then passed to hydraulic motor 48 wherein it is reduced in pressure to recover a substantial amount of power which is used to drive stripped rich liquid pump 50. Absorber liquid containing dissolved $CO_2$ is then passed at a temperature of $-27°$ F. and a pressure of 20 p.s.i.g. through line 52 to the top of rich stripper 54 wherein it flows downward in countercurrent contact with stripping gas. The liquid leaves rich stripper 54 by way of line 56 after the major portion of the absorbed $CO_2$ has been stripped therefrom. The bulk of this liquid is transferred by pump 50 through line 24 to the top of rich absorber 22 as the rich absorber liquid. A minor portion of the liquid from rich stripper 54 flows through line 58, pump 60, and heat exchangers 62 and 46 into the top of lean stripper 40 wherein it is countercurrently contacted with fresh stripping gas. The minor portion of the liquid from rich stripper 54 is warmed in heat exchangers 62 and 46 from a temperature of $-75°$ F. to a temperature of $-27.5°$ F. This liquid leaves lean stripper 40 through line 64 at a temperature of $-38°$ F. and, because of the relatively high temperature of $-27.5°$ F. at which it enters lean stripper 40 and its additional contact with fresh stripping gas therein, contains very little $CO_2$ and is suitable for use as lean absorber liquid. Accordingly, this liquid is transferred by pump 66 to the top of lean absorber 28 through line 30 after being cooled to a temperature of $-64°$ F. in heat exchanger 62 by liquid from rich stripper 56.

A suitable stripping gas such as dry waste nitrogen from an air separation plant is supplied by blower 68 to the bottom of lean stripper 40 through line 70 at a pressure of 2 p.s.i.g. after being cooled from $100°$ F. to $-20°$ F. in heat exchanger 14 by product gas and waste gas leaving the system through lines 42 and 72, respectively. The stripping gas passes in countercurrent contact with downflowing enriched liquid, first in lean stripper 40 and then in rich stripper 54. Waste gas comprising the stripping gas and stripped $CO_2$ leaves rich stripper 54 through line 74 at a temperature of $-58°$ F. and at atmospheric pressure and passes through heat exchanger 76 wherein it is cooled by ethylene to a temperature of $-65°$ F. to condense vaporized acetone which is separated from the gas in separator 78. Liquid acetone flows from separator 78 through line 80 into line 56. Waste gas leaves the top of separator 78 through line 72 at a temperature of $-65°$ F. and a pressure of $-1.7$ p.s.i.g. and serves to cool incoming feed gas and stripping gas in heat exchanger 14 which it leaves at a temperature of $90°$ F. and a pressure of $-5.7$ p.s.i.g. The waste gas is discharged to the atmosphere at a temperature of $159°$ F. and a pressure of 0.3 p.s.i.g. by exhaust blower 82 connected to line 78 at the warm end of heat exchanger 14.

It has been found that the use of an exhaust blower to draw the stripping and waste gases through the strippers and subsequent piping and heat exchangers makes it possible to decrease the pressure in the strippers by at least 5 p.s.i. as compared with the use of only a blower to inject the stripping gas into and through the strippers and the subsequent piping and heat exchangers. This seemingly small reduction of pressure in the strippers results in the stripping of $CO_2$ from the enriched absorber liquid to the desired extent with substantially less stripping gas. To illustrate this unusual effect, when using the process described, 44.7 MM s.c.f.d. (million standard cubic feet per day) of feed gas may be purified to yield 26.6 MM s.c.f.d. of purified hydrogen containing about 30 parts per million of $CO_2$, through the use of 6.7 MM s.c.f.d. of stripping gas. However, if the same process is operated without exhaust blower 82 and with a blower 68 of sufficient capacity to force the stripping gas through the strippers and other parts of the absorption system, then 9.0 MM s.c.f.d. of stripping gas are needed to accomplish the same purification job. This surprisingly large difference in stripping gas consumption has been found attributable to the small pressure reduction in the strippers; in the example involving exhaust blower 82, the maximum stripping pressure is 2 p.s.i.g. at the base of stripper 40, whereas in the other example omitting exhaust blower 82, the maximum stripping pressure is 8 p.s.i.g. In accordance with this invention, the maximum stripping pressure is kept below 5 p.s.i.g. and preferably does not exceed 3 p.s.i.g. The lowest stripping pressure as determined at the top of rich stripper 54 should not exceed 1 p.s.i.g. Sub-atmospheric pressures may be maintained in the strippers by an exhaust blower 82 of sufficient capacity, but generally such sub-atmospheric pressures are not favored in view of the possibility of air leaking into the strippers.

In view of the various modifications of the invention which occur to those skilled in the art upon consideration of the foregoing disclosure without departing from the spirit or scope thereof, only such limitations should be imposed as are indicated by the appended claims.

What is claimed is:

1. A process for separating at least one component of mixed gases by absorption in and desorption from absorber liquid which comprises flowing said mixed gases at elevated pressure and a stripping gas at close to atmospheric pressure through a heat exchange zone in indirect heat exchange relation with purified product gas and waste stripping gas to cool said mixed gases and said stripping gas, passing the cooled mixed gases at elevated pressure through an absorption zone in countercurrent contact with said absorber liquid to enrich said absorber liquid by absorption of said component and yield said purified product gas, stripping the absorbed component from the enriched absorber liquid by passing the cooled stripping gas in countercurrent contact therewith through a stripping zone to yield said absorber liquid for reuse in said absorption zone and said waste stripping gas containing the desorbed component, and drawing said waste stripping gas through said heat exchange zone at sub-atmospheric pressure.

2. The process of claim 1 wherein the cooled mixed gases passing through the absorption zone are countercurrently contacted first with a rich absorber liquid to remove a major portion of said component from said cooled mixed gases and then with a lean absorber liquid to remove an additional quantity of said component from said cooled mixed gases, the enriched lean absorber liquid being admixed with, and utilized as, said rich absorber liquid, the enriched rich absorber liquid is passed to the stripping zone wherein the major portion of the absorbed component is stripped therefrom to yield said rich absorber liquid for reuse in said absorption zone and wherein an additional quantity of said absorbed component is further stripped from a minor portion of said rich absorber liquid to yield said lean absorber liquid for reuse in said absorption zone.

3. The process of claim 2 wherein a component which is absorbed is carbon dioxide and acetone is used as both rich and lead absorber liquids.

4. The process of claim 1 wherein the gasses leaving the absorption and stripping zones are each cooled by means of an external refrigerant to condense and separate therefrom vaporized absorber liquid, and the thus separtaed absorber liquid is reused in said absorption zone.

5. The process of claim 1 wherein a component which is absorbed is carbon dioxide and the absorber liquid is acetone.

6. A process for separating carbon dioxide from mixed gases containing carbon dioxide by absorption in and desortpion from absorber liquid which comprises passing said mixed gasses at elevated pressure through an absorption zone in countercurrent contact with said absorber liquid to enrich said absorber liquid by absorption of said component and yield purified product gas, cooling the enriched absorber liquid, stripping at decreasing temperature the absorbed component from the cooled enriched absorber liquid by passing stripping gas at decreasing temperatures in countercurrent contact therewith through a stripping zone to yield said absorber liquid for reuse in said absorption zone and waste stripping gas containing the desorbed component, maintaining a maximum pressure in said stripping zone as determined at the bottom of said stripping zone below 5 p.s.i.g., withdrawing waste stripping gas at a pressure substantially atmospheric and re-compressing and further cooling said absorber liquid before reuse.

7. The process of claim 6 wherein the absorber liquid is acetone.

8. The process of claim 6 wherein the absorber liquid is acetone and the gases leaving the absorption and stripping zones are each cooled by means of an external refrigerant to condense and separate therefrom vaporized absorber liquid, and the thus separated absorber liquid is reused in said absorption zone.

9. In a low-temperature absorption system comprising a high-pressure absorption tower, a low-pressure stripping tower, pressure reducing means for reducing the pressure of absorber liquid leaving said absorption tower prior to its entry into said stripping tower, a pump for recycling absorber liquid from said stripping tower to said absorption tower, means for passing stripping gas upward through said stripping tower, and a heat exchanger for recovering refrigeration from said stripping gas leaving said stripping tower, the improvement which comprises exhausting means to draw said stripping gas leaving said stripping tower through said heat exchanger at sub-atmospheric pressure.

10. The low-temperature absorption system of claim 9 wherein a refrigerated condenser for vaporized absorber liquid is provided in the flow path of the stripping gas leaving the stripping tower.

11. The low-temperature absorption system of claim 9 wherein the pressure reducing means is a hydraulic motor and said hydraulic motor is arranged to drive the pump.

References Cited in the file of this patent
UNITED STATES PATENTS

| | | |
|---|---|---|
| 2,048,656 | Hunt et al. | July 21, 1936 |
| 2,236,964 | Babcock | Apr. 1, 1941 |
| 2,297,675 | Dayhuff et al. | Oct. 6, 1942 |
| 2,555,060 | Schuftan | May 29, 1951 |
| 2,596,785 | Nelly et al. | May 13, 1952 |
| 2,610,704 | Patterson | Sept. 16, 1952 |
| 2,826,266 | Hachmuth et al. | Mar. 11, 1958 |

UNITED STATES PATENT OFFICE

CERTIFICATION OF CORRECTION

Patent No. 2,970,451                                    February 7, 1961

Stanley W. Ehrlich et al.

It is hereby certified that error appears in the above numbered patent requiring correction and that the said Letters Patent should read as corrected below.

In the grant, lines 3 and 4, and in the heading to the printed specification, line 6, for "a corporation of New York", each occurrence, read -- a corporation of New Jersey --; column 4, line 60, for "lead" read -- lean --.

Signed and sealed this 4th day of July 1961.

(SEAL)
Attest:

ERNEST W. SWIDER                                DAVID L. LADD
Attesting Officer                                   Commissioner of Patents